United States Patent [19]

Hedblom

[11] 4,321,761
[45] Mar. 30, 1982

[54] DEVICE FOR UPROOTING TREE STUMPS

[76] Inventor: Sören Hedblom, Box 235, S-820 23 Bergvik, Sweden

[21] Appl. No.: 160,435

[22] Filed: Jun. 17, 1980

[30] Foreign Application Priority Data

Jun. 20, 1979 [SE] Sweden .............................. 7905418

[51] Int. Cl.³ ............................................ A01G 23/06
[52] U.S. Cl. ...................................... 37/2 R; 254/132
[58] Field of Search ...................... 37/2 R; 7/114–116; 254/132, 128

[56] References Cited

U.S. PATENT DOCUMENTS

| 2,535,099 | 12/1950 | Slick | 37/2 R X |
| 2,664,651 | 1/1954 | Woodward | 37/2 R |
| 2,682,715 | 7/1954 | Walby | 37/2 R |
| 3,201,089 | 8/1965 | Napoletano | 37/2 R X |

FOREIGN PATENT DOCUMENTS

| 1134238 | 8/1962 | Fed. Rep. of Germany | 37/2 R |
| 1940446 | 5/1971 | Fed. Rep. of Germany | 37/2 R |
| 7703054 | 9/1978 | Sweden | 37/2 R |
| 741879 | 12/1955 | United Kingdom | 37/2 R |
| 278289 | 11/1970 | U.S.S.R. | 37/2 R |
| 518185 | 8/1976 | U.S.S.R. | 37/2 R |

*Primary Examiner*—Clifford D. Crowder
*Attorney, Agent, or Firm*—Charles E. Brown

[57] ABSTRACT

A device for breaking loose tree stumps from the ground comprises a vehicle, an arm or the like carried by the vehicle and a tool carried by said arm and engageable with a stump. The tool comprises at least two members movable relative to each other when the tool has been located in an uprooting position relative to the stump. One of said members is adapted to rest against the ground while the tool may lift the stump by means of the relative movement of the members.

6 Claims, 6 Drawing Figures

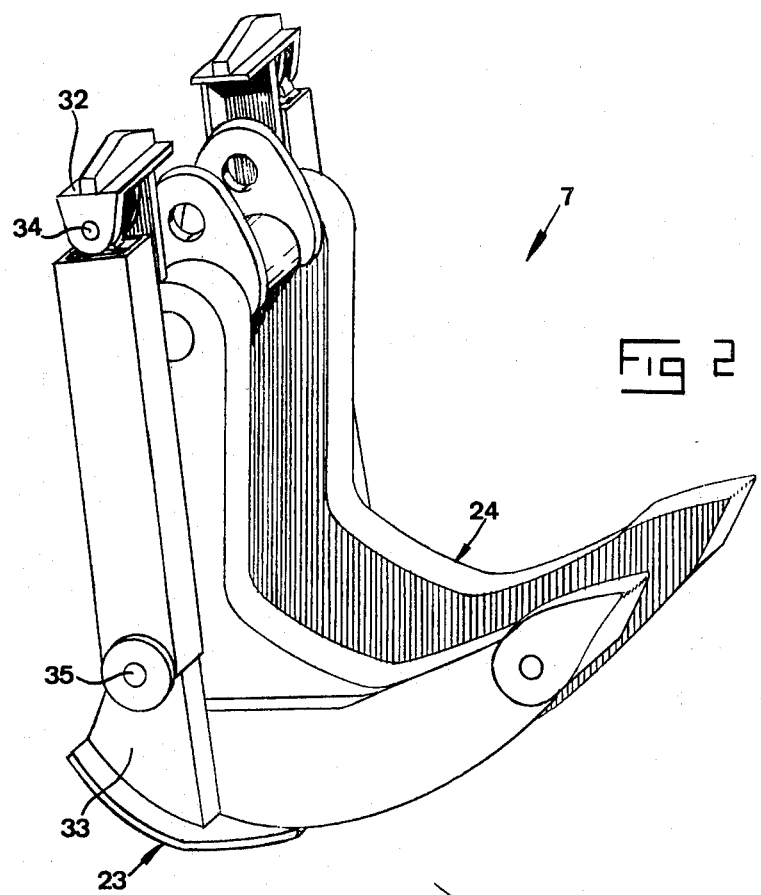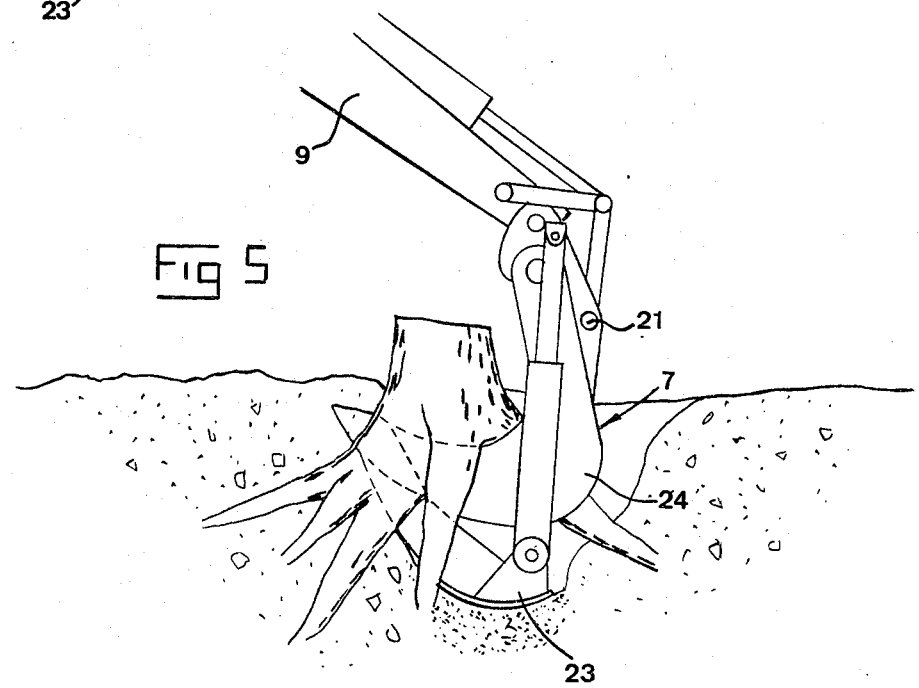

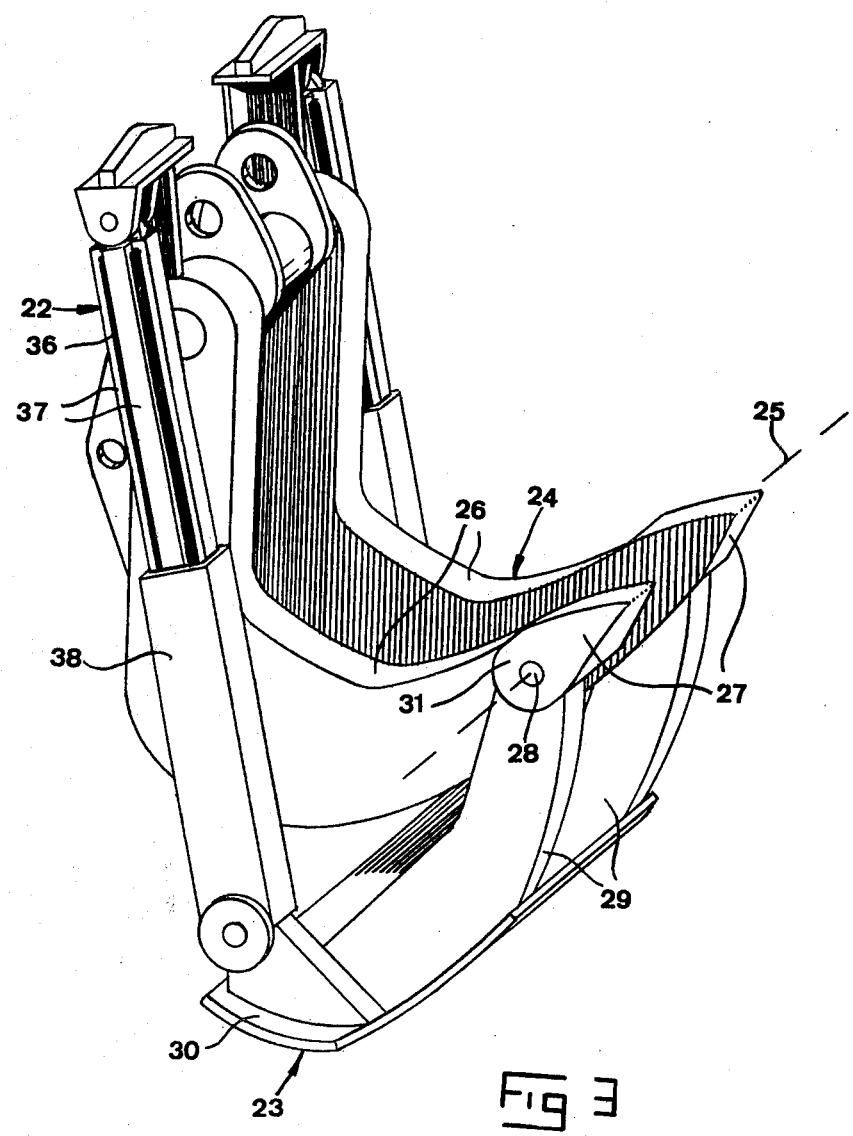

DEVICE FOR UPROOTING TREE STUMPS

This invention relates to a device for uprooting tree stumps from the ground, comprising a vehicle, an arm or the like carried by the vehicle and a tool carried by the arm and engageable with a stump, said tool being pivotably connected to the arm and comprising a claw, which may be introduced under portions of the stump, and a support member for application against the ground, said support member being movable relative to the claw, a pressure exerting means connected to the support member being adapted to press the support member against the ground, while the claw is introduced under the stump, in order to cause the claw to move upwardly, thereby breaking loose the stump from the ground.

A device of this kind is known by the published Swedish patent application No. 7703054-2, the support member of which is linearly movable to and fro. This involves difficulties as to the manoeuvre ability of the tool. When the support member has been moved downwardly in relation to the tool, it is difficult to pivot the tool relative to the arm in order to adjust the engagement of the claw under the stump. In addition, the support member requires strong slide guides in the form of tubes or the like but may nevertheless easily be subjected to damages.

The object of the invention is to reduce said disadvantages as far as possible.

This object is obtained in that the support member is pivotably connected to the claw about an axis spaced from the pivotal connection of the tool to the arm or the like. In this way, possibilities are created to obtain an extremely efficient operation ability of the support member at the same time as the support member will allow adjustment as to the position of the claw under the stump.

A support member pivotably connected to the claw and to a pressure exerting means is known by the German Publication No. 1 134 238. However, said support member is only intended to enable lifting of the stump after it has been broken loose from the ground. In addition, the support member is pivotable relative to the claw about the same axis that allows pivoting of the claw relative to a carrier arm connected to a vehicle.

With reference to the appended drawings, below follows a more specific description of an embodiment according to the invention.

In the drawings:

FIG. 2 is a perspective view of an uprooting tool contained in the device;

FIG. 3 is a view similar to FIG. 2 but illustrating the tool in another operative position;

FIG. 5 is a view illustrating the tool while breaking loose a stump; and

Figure 1:
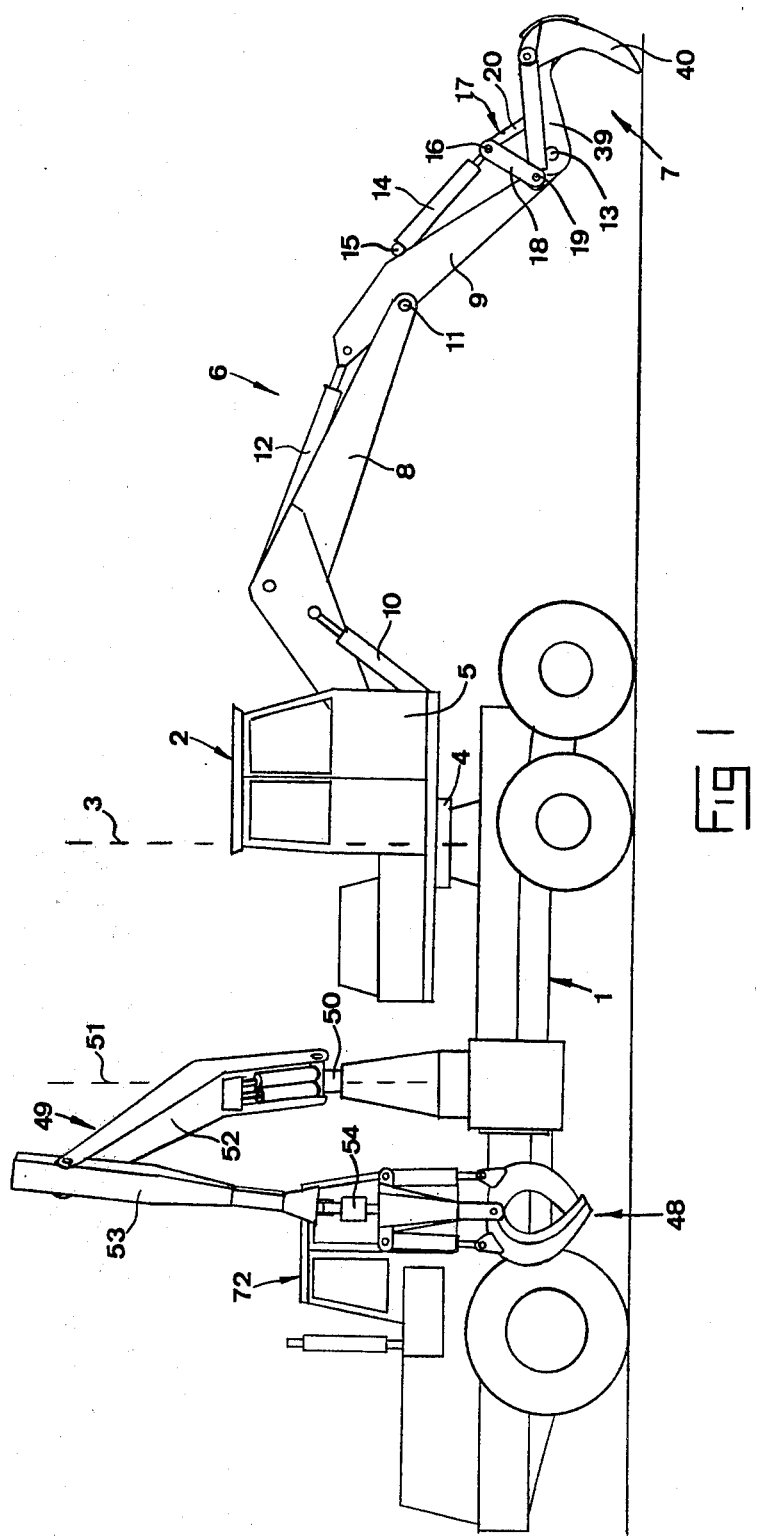
FIG. 1 is a side view of the device according to the invention.

In FIG. 1, a vehicle denoted 1 is illustrated. The vehicle may be of the type suited for forest work and having e.g. three wheel shafts provided with rubber wheels. The vehicle may be of the "waist-steered" type and comprise a forward and a rear part which are hingedly connected about a vertical shaft. On the rear part of the vehicle, there is mounted an excavator assembly 2 comprising a housing 5, which is rotatable about a vertical axis 3 by means of a rotator device 4, and a crane 6 of a suitable known kind mounted thereon. The crane 6 carries a tool 7 engageable with a tree stump. The crane comprises two arms 8, 9, a first 8 of which is hingedly connected to the housing 5 and which may be raised and lowered by means of a piston cylinder mechanism 10 while the other 9 is hingedly connected to the first arm 8 at a hinge 11 and pivotable relative to arm 8 by means of a piston cylinder mechanism 12. The tool 7 is hingedly connected to the arm 9 about a horizontal axis 13, about which the tool 7 is pivotable in a vertical plane by means of a piston cylinder mechanism 14 acting between a pivot 15 on the arm 9 and a pivot 16 of a link arrangement 17, which comprises a first link 18 extending between the pivot 16 and pivot 19 on the arm 9 and a second link 20 extending between the pivot 16 and a pivot 21 (FIG. 5) on the tool 7.

Figure 4:
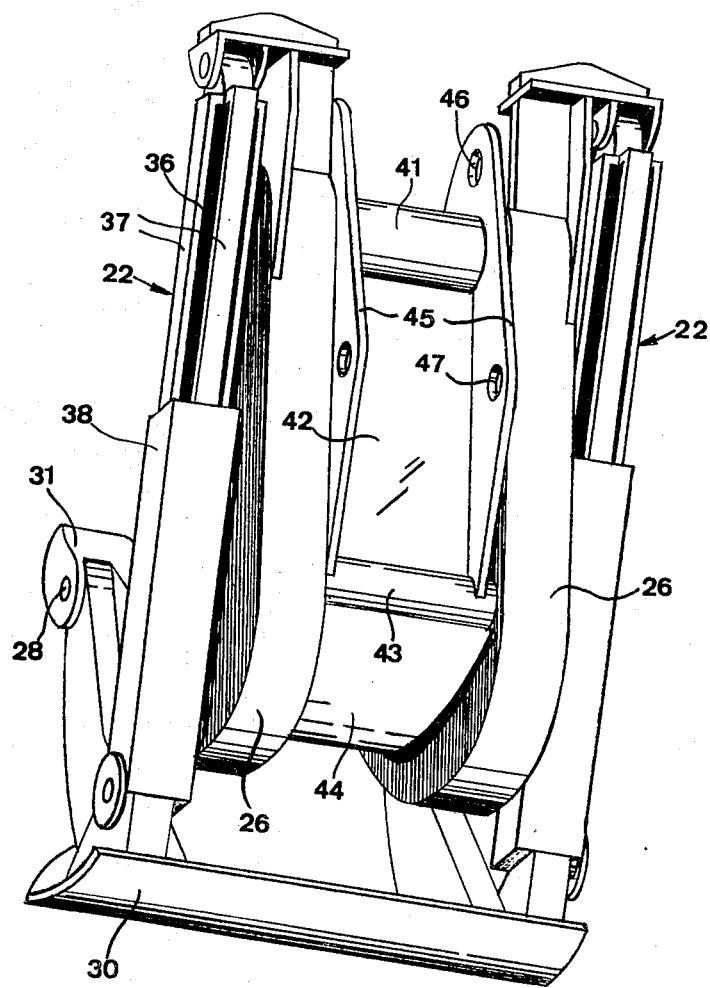
FIG. 4 is a view obliquely from behind of the tool in FIG. 3.

The tool 7 comprises at least two members 23, 24 (FIG. 3) which may be moved in relation to each other by means of two pressure exerting means 22 when the tool has been located in an uprooting position relative to the stump. A first 23 of said members is adapted to support against the ground while the tool is lifting the stump by means of the relative movement of the two members. The members 23, 24 are pivotably journalled to each other about a generally horizontal axis 25. The member 24 comprises two claws 26 which are spaced from each other and, viewed from the side, have a curved angular appearance to simplify the introduction of the claws under a stump. The support member 23 is movable between a first position (FIG. 1 and 2), in which member 23 and the claws 26, viewed from the side, are located in a generally overlapping relation, and a second position (FIGS. 3, 4 and 5), in which portions of member 23 are located spaced from or under claws 26.

The support member 23 is pivotably journalled adjacent the outer ends 27 of the claws 26. Member 23 comprises two arms 29, which are pivotably connected at the outer ends 27 of the claws 26 about shafts 28, and a support plate 30 interconnecting the arms. The outer ends 27 of claws 26 have extensions 31 directed sidewardly and away from each other, said extensions carrying the stub shafts 28 projecting through holes (not illustrated) in the adjacent ends of arms 29. The lower side of arms 29 is curved in correspondence to the curvature of the lower sides of claws 26 and also the support plate 30 has a curved shape corrresponding to said curvature.

The pressure exerting means 22 are constituted by piston cylinder mechanisms, each of which is acting between a bracket 32 which is rigidly connected in relation to claws 26 and a bracket 33 on member 23. Each of said piston cylinder mechanisms is pivotably connected to the brackets via shaft pins 34, 35 forming axes of rotation parallel to each other and to the axes 25 and 13. It is preferred that the brackets 32 are attached directly to the claws 26 or to a frame rigidly connected to said claws. It is also conceivable to pivotably connect the corresponding ends of the piston cylinder mechanisms to extensions of the shaft 13. Four longitudinal reinforcement ribs 37 are connected to the cylinder of each piston cylinder mechanism, said ribs being uniformly distributed about the circumference of the cylinder. The cylinder 36, which is connected to the pin 34, and the ribs 37 are received within a tubular protective section 38 having a square cross section. The section 38 is pivotably connected to the pin 35 as is the piston rod of piston cylinder mechanism 22, said piston rod being located within and protected by section 38. When the support member 23 is in the position in FIG. 2, section 38 encloses the piston rod as well as the cylinder of the piston cylinder mechanism 22.

The claws 26 comprise, viewed from the side, two legs 39, 40 (FIG. 1) extending at an angle to each other and interconnected in a curved manner in the transition area. As is apparent from FIG. 4, the legs 39 of claws 26 interconnected by means of rod and plate elements 41–43, which with the legs 39 form a frame of the tool for the claws 26 (legs 40). In the area of the curved connection of the legs 39, 40 to each other, claws 26 are interconnected by a curved plate 44, which terminates at a considerable distance from the ends 27 of the claws. The legs 39 are provided with two spaced apart brackets 45 having holes 46, 47 for receiving the shaft pins 13 and 21 respectively (FIGS. 1 and 5). The brackets 45 are of a "universal" type so that the tool 7 may be easily attached to crane arms 6 of different designs.

Figure 6:
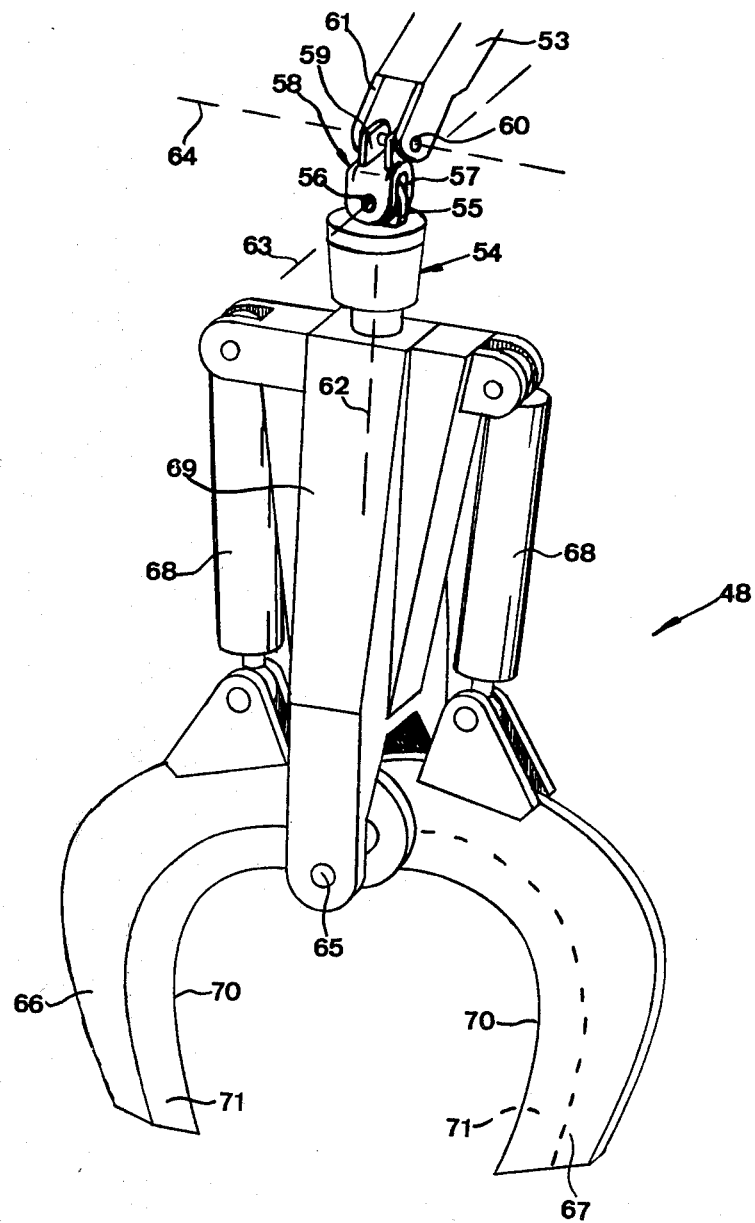
FIG. 6 is a perspective view of a cutting tool included in the device.

As appears by FIG. 1, the vehicle 1 also carries a cutting tool 48 to cut the stumps into smaller pieces more suitable for transportation. The cutting tool is operable independently of tool 7 in that the cutting tool is suspended in a second crane 49 carried by the vehicle. Crane 49 is mounted on the vehicle forwardly of housing 5 and is rotatable about a vertical axis 51 by means of a suitable rotator device 50. The crane comprises e.g. two arms 52, 53 and tool 48 is connected to the free end of arm 53 by means of a drive and bearing assembly 54 of a kind known per se and being able to cause rotation of the tool about a vertical axis. The assembly 54 comprises a motor, e.g. a hydraulic motor. The assembly 54 comprises an ear 55 (FIG. 6) having a hole housing a pin 56, which protrudes through holes in two ears 57 of a connector 58, which also has two ears 59 perpendicular to ears 57. A pin 60 protrudes through holes in ears 59 and also holes in ears 61, which are provided on the outer end of crane arm 53. Thus, cutting tool 48 is rotatable about a generally vertical axis 62 by means of assembly 54 and pivotable about two horizontal axes 63, 64 perpendicular to each other. The tool 48 will always hang downwardly as appears by FIGS. 1 and 6.

The cutting tool 48 comprises two curved cutting blades 66, 67 pivotably connected about an axis 65. Two piston cylinder mechanisms 68 are rotatably connected to a frame 69 of tool 48 and to blades 66 and 67 respectively. Thus, the blades may be pivoted towards and away from each other about axis 65 in a generally vertical plane by mechanisms 68. Each blade 66, 67 has an edge 70 and one side of each blade has a bevelling 71. The rear side of blade 66 and the forward side of blade 67 are planar while the bevellings 71 are on the forward side of blade 66 and the rear side of blade 67. This design of the blade will cause them to be pressed against each other during cutting of a stump due to the bevellings.

The crane arm 6 and tool 7 are operated by an operator in housing 5 while crane arm 49 and tool 48 are operated by an operator in the driving compartment 72 of vehicle 1, said last operator also having to take care of all movements of vehicle 1.

The device according to the invention is used as follows: Vehicle 1 may easily be driven in the terrain into such a position that one or more stumps may be engaged by tool 7. When a stump is to be picked up, the claws 26 of tool 7 are introduced under the stump as illustrated in FIG. 5. Thereafter, support member 23 is pivoted in relation to claws 26 as indicated in FIG. 5 by piston cylinder mechanisms 22. Member 23 serves as a support against the ground while claws 26 are efficiently urged upwardly while breaking loose the stump. An advantage with the invention is of course that a minimum amount of swaying forces is applied on the vehicle in that tool 7 itself may lift the stump without necessitating exertion of excessive forces by means of crane arm 6. A rather limited height of lift is sufficient to completely or almost completely break loose the stump from the ground.

The curved design of the support member corresponding to the design of the claw(s) in combination with the defined pivotal ability of the support member makes it possible to move the tool under the stump also when the support member is in a downwardly pivoted position in that it will slide on the ground (see FIG. 5). The one end of the support member coincides generally with the outer end of the claws and in a direction away from said claw end, the support member diverges from the claw in the FIG. 5 position.

After the lifting operation by member 23, the stump may easily be lifted out of the ground by crane arm 6. In tests, the device according to the invention has functioned surprisingly well, also in frozen ground. As stumps are picked up by tool 7 and the vehicle is moved in the terrain, the operator in driving compartment 72 may conveniently cut the uprooted stumps into smaller pieces of desired size. Tool 48 may easily be adjusted to attain the desired line of action on the stump. It is to be understood that each of cranes 6 and 49 should have a semi circular operational area so that the cranes will not accidentally collide with each other. These operational areas may conveniently be defined by limit switches cooperating with the rotator devices 4 and 50.

The support member 23 preferably has a length corresponding to the length of the leg 40 of a claw and the mechanism(s) 22 is preferably generally perpendicular to the claw leg 40.

Modifications are possible within the scope of the claims.

What is claimed is:

1. In a device for uprooting tree stumps from the ground, comprising a vehicle, an arm carried by the vehicle and a tool carried by the arm and engageable with a stump, said tool being pivotably connected to the arm and comprising a claw, which may be introduced under portions of the stump, and a support member for application against the ground, said support member being movable relative to the claw, a pressure exerting means connected to the support member being adapted to press the support member against the ground, while the claw is introduced under the stump, in order to cause the claw to move upwardly, thereby breaking loose the stump from the ground; the improvement that the support member is pivotably connected to the claw about an axis spaced from the pivotal connection of the tool to the arm.

2. A device according to claim 1, wherein the support member is pivotable relative to the claw between a first position, in which the support member and the claw, viewed from the side, are located in a generally overlapping relation, and a second position, in which portions of the support member are located spaced from and under the claw.

3. A device according to claim 1, wherein the support member is pivotably connected to the claw adjacent its outer end.

4. A device according to claim 1, wherein the tool comprises two claws spaced from each other and the support member comprises two arms pivotably connected to the outer ends of the claws and a support plate interconnecting the arms.

5. A device according to claim 1, wherein the pressure exerting means comprises a piston cylinder mechanism acting between the tool and its support member.

6. A device according to claim 5, wherein the piston cylinder mechanism is pivotably connected to the support member and to the claw.

* * * * *